US010690857B2

(12) United States Patent
Chen et al.

(10) Patent No.: US 10,690,857 B2
(45) Date of Patent: Jun. 23, 2020

(54) OPTICAL COUPLING SYSTEMS

(71) Applicant: FINISAR CORPORATION, Sunnyvale, CA (US)

(72) Inventors: Jiashu Chen, Milpitas, CA (US); Yuxin Zhou, Fremont, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/014,998

(22) Filed: Jun. 21, 2018

(65) Prior Publication Data

US 2018/0372956 A1 Dec. 27, 2018

Related U.S. Application Data

(60) Provisional application No. 62/522,873, filed on Jun. 21, 2017.

(51) Int. Cl.
*G02B 6/42* (2006.01)
*G02B 6/30* (2006.01)

(52) U.S. Cl.
CPC .............. *G02B 6/30* (2013.01); *G02B 6/421* (2013.01); *G02B 6/4204* (2013.01); *G02B 6/4214* (2013.01); *G02B 6/4246* (2013.01)

(58) Field of Classification Search
CPC .......... G02B 6/30; G02B 6/34; G02B 6/4202; G02B 6/4214
USPC .......... 385/31, 88, 89, 92, 93; 398/139, 200, 398/201, 212, 214
See application file for complete search history.

(56) References Cited

U.S. PATENT DOCUMENTS

| | | | |
|---|---|---|---|
| 6,259,840 B1 * | 7/2001 | Munoz-Bustamante | ............ G02B 6/43 385/14 |
| 6,527,456 B1 * | 3/2003 | Trezza | ............ G02B 6/43 385/116 |
| 6,785,447 B2 * | 8/2004 | Yoshimura | ............ G02B 6/10 257/E23.01 |
| 7,136,551 B2 * | 11/2006 | Cho | ............ G02B 6/06 385/31 |
| 8,737,845 B2 * | 5/2014 | Fiorentino | ............ G02B 6/4204 385/37 |
| 9,594,220 B1 * | 3/2017 | Sutherland | ............ G02B 6/125 |
| 10,371,904 B2 * | 8/2019 | Jou | ............ G02B 6/428 |
| 2002/0181882 A1 * | 12/2002 | Hibbs-Brenner | ............ G02B 6/30 385/52 |
| 2005/0058399 A1 * | 3/2005 | Nishizawa | ............ G02B 6/4214 385/39 |

(Continued)

*Primary Examiner* — Robert Tavlykaev
(74) *Attorney, Agent, or Firm* — Maschoff Brennan

(57) ABSTRACT

An optical coupling system includes a first waveguide that includes a first waveguide end, a second waveguide end. The optical coupling system includes a first lens that is aligned with a first optical fiber. The optical coupling system includes a first lens holder that retains the first lens. The lens holder includes a waveguide retention portion on which the first waveguide end is positioned such that the first waveguide end is aligned with the first lens. The optical coupling system includes a second lens that is aligned with a first optical component. The optical coupling system includes a second lens holder that retains the second lens. The second lens holder includes a waveguide retention portion on which the second waveguide end is positioned such that the second waveguide end is aligned with the second lens.

20 Claims, 8 Drawing Sheets

(56) References Cited

U.S. PATENT DOCUMENTS

| | | | | |
|---|---|---|---|---|
| 2008/0031583 A1* | 2/2008 | Ohtsu | ............ | G02B 6/10 |
| | | | | 385/130 |
| 2011/0241564 A1* | 10/2011 | Shimizu | ............ | G02B 6/421 |
| | | | | 315/291 |
| 2012/0213475 A1* | 8/2012 | Selli | ............ | G02B 6/4214 |
| | | | | 385/33 |
| 2013/0223795 A1* | 8/2013 | Sasaoka | ............ | G02B 6/262 |
| | | | | 385/32 |
| 2018/0149815 A1* | 5/2018 | Heroux | ............ | G02B 6/43 |

* cited by examiner

OPTICAL COUPLING SYSTEMS

CROSS-REFERENCE TO RELATED APPLICATION

This application claims priority to and the benefit of U.S. Provisional Application No. 62/522,873, filed Jun. 21, 2017, which is incorporated herein by reference in its entirety.

FIELD

The embodiments discussed herein are related to optical communication systems. In particular, some embodiments relate to optical coupling systems that may be implemented in optical communication systems.

BACKGROUND

In some optical modules, active optical components such as optical sources and optical receivers may be positioned adjacent to lenses. Positioning the active optical components adjacent to the lenses minimizes unguided propagation of optical signals and coupling losses that may be caused at least partially by the unguided propagation.

However, the positioning of the active optical components adjacent to the lenses may result in structural and thermal issues. For example, some optical modules are constructed to meet a multi-source agreement (MSA). The MSA may limit physical dimensions of the optical modules. Accordingly, the active optical components may be grouped in the optical modules to fit within the physical dimensions set by the MSA. Grouping the active optical components may result in concentrations of thermal energy, which may affect operational characteristics of the active optical components. Additionally, conformity to MSA may limit dimensions and configurations of optical components.

The subject matter claimed herein is not limited to embodiments that solve any disadvantages or that operate only in environments such as those described above. Rather, this background is only provided to illustrate one example technology area where some embodiments described herein may be practiced.

SUMMARY

An aspect of an embodiment includes an optical coupling system that may include a first waveguide, a first lens, a first lens holder, a second lens, and a second lens holder. The first waveguide may include a first waveguide end, a second waveguide end, and a waveguide core. The first lens may be positioned relative to a first optical fiber such that a core of the first optical fiber is aligned with the first lens. The first lens holder may include a lens retention portion and a waveguide retention portion. The lens retention portion may retain the first lens. The lens retention portion may be configured such that an optical signal is transmissible through the lens retention portion. The first waveguide end of the first waveguide may be positioned on the waveguide retention portion such that the first waveguide end is adjacent to the lens retention portion and the waveguide core is aligned with the first lens. The second lens may be aligned relative to a first optical component. The second lens holder may include a lens retention portion and a waveguide retention portion. The lens retention portion may retain the second lens. The lens retention portion may be configured such that the optical signal is transmissible through the lens retention portion. The second waveguide end of the first waveguide may be positioned on the waveguide retention portion such that the second waveguide end is adjacent to the lens retention portion of the second lens holder and the waveguide core is aligned with the second lens.

Another aspect includes an optical module that may include a flex/stiffener, a first active optical component, a first waveguide, a first lens, a first lens holder, a second lens, and a second lens holder. The first active optical component may be positioned on the flex/stiffener. The first waveguide may include a first waveguide end, a second waveguide end, and a waveguide core. The first lens may be positioned relative to a first optical fiber such that a core of the first optical fiber is aligned with the first lens. The first lens holder may include a lens retention portion that may retain the first lens and a waveguide retention portion on which the first waveguide end may be positioned such that the first waveguide end is adjacent to the lens retention portion and the waveguide core is aligned with the first lens. The second lens may be aligned relative to the first active optical component. The second lens holder may include a lens retention portion that may retain the second lens and a waveguide retention portion on which the second waveguide end may be positioned such that the second waveguide end is adjacent to the lens retention portion of the second lens holder and the waveguide core is aligned with the second lens.

Yet another aspect includes a board-mounted optical engine that may include a flex circuit, an active optical component, a first waveguide, a first lens, a first lens holder, a second lens, a second lens holder, and a lens retention super-structure. The active optical component may be electrically coupled to the flex circuit. The first waveguide may include a first waveguide end, a second waveguide end, and a waveguide core. The first lens may be positioned relative to a first optical fiber such that a core of the first optical fiber is aligned with the first lens. The first lens holder may include a lens retention portion that may retain the first lens and a waveguide retention portion on which the first waveguide end of the first waveguide may be positioned. The first waveguide may be positioned such that the first waveguide end is adjacent to the lens retention portion and the waveguide core is aligned with the first lens. The second lens may be aligned relative to a first optical component. The second lens holder may include a lens retention portion that may retain the second lens and a waveguide retention portion on which the second waveguide end of the first waveguide may be positioned. The second waveguide end may be positioned such that the second waveguide end is adjacent to the lens retention portion of the second lens holder and the waveguide core is aligned with the second lens. The lens retention super-structure may be configured to house the first lens holder and the second lens holder such that the second lens holder is aligned with the first active optical component.

The object and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Some example embodiments are described with reference to the accompanying drawings. In the accompanying drawings, features with like item numbers indicate like function and structure unless described otherwise.

Figure 1A:
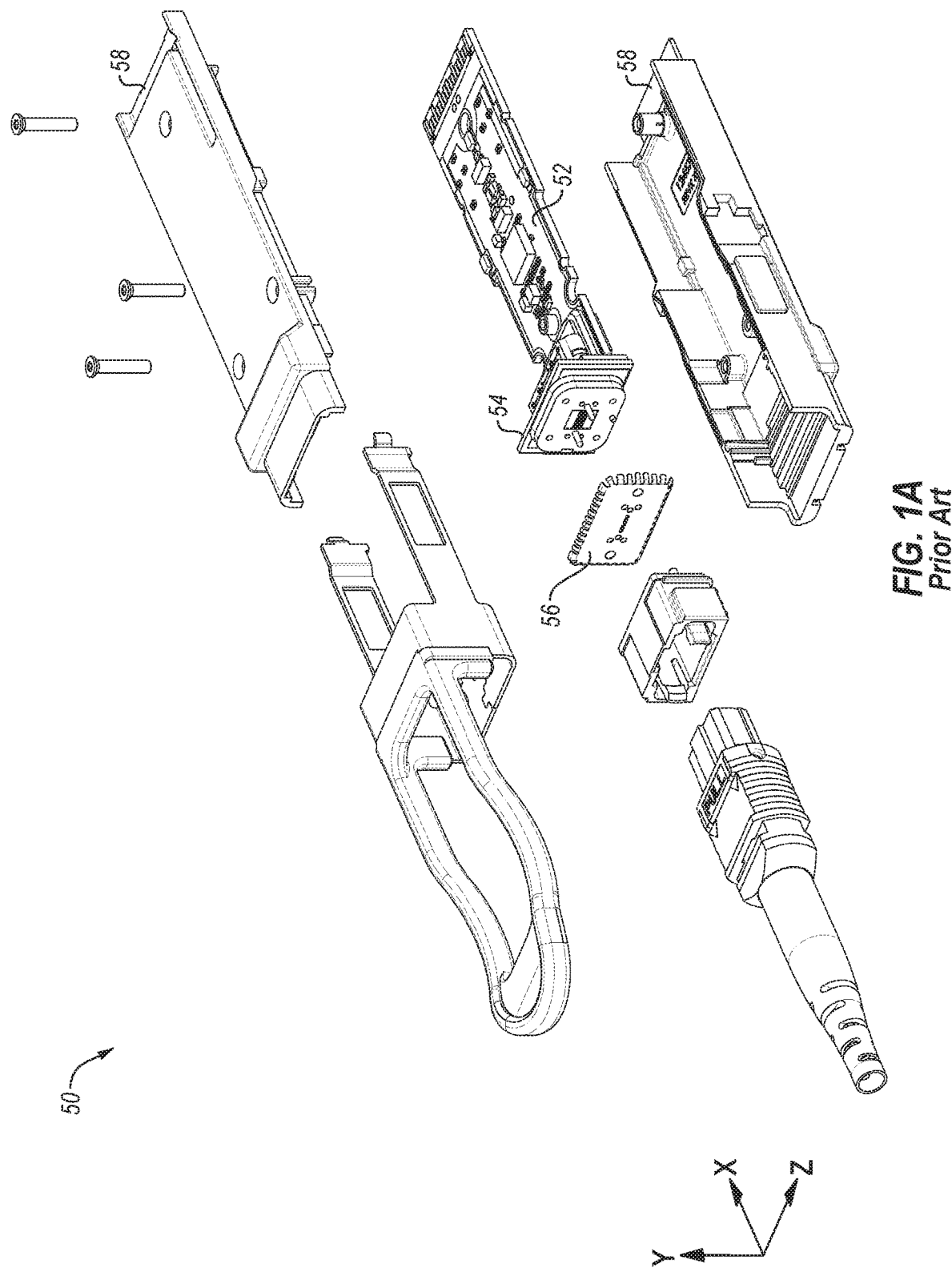
FIG. 1A depicts an example optical module that may implement a straight-through optics arrangement.

FIG. 1A is an exploded view of a pluggable optical module 50. The pluggable optical module 50 includes one or more active optical components (e.g., optical components 108A and 108B described below with reference to FIG. 1B). The active optical components may be positioned or mounted on a flex/stiffener 54. The flex/stiffener 54 may be substantially parallel to the yz-plane of FIG. 1A. The flex/stiffener 54 may be positioned substantially adjacent to a lens assembly 56. In the pluggable optical module 50, the flex/stiffener 54 must fit within a module shell 58, which may be sized to comply with a multi-source agreement (MSA). Accordingly, the height and width of the flex/stiffener 54 may be limited to comply with the MSA. Limitation of an area of the flex/stiffener 54 may result in crowding of the optical components, which may further result in concentration of thermal energy on the flex/stiffener 54.

Figure 1B:
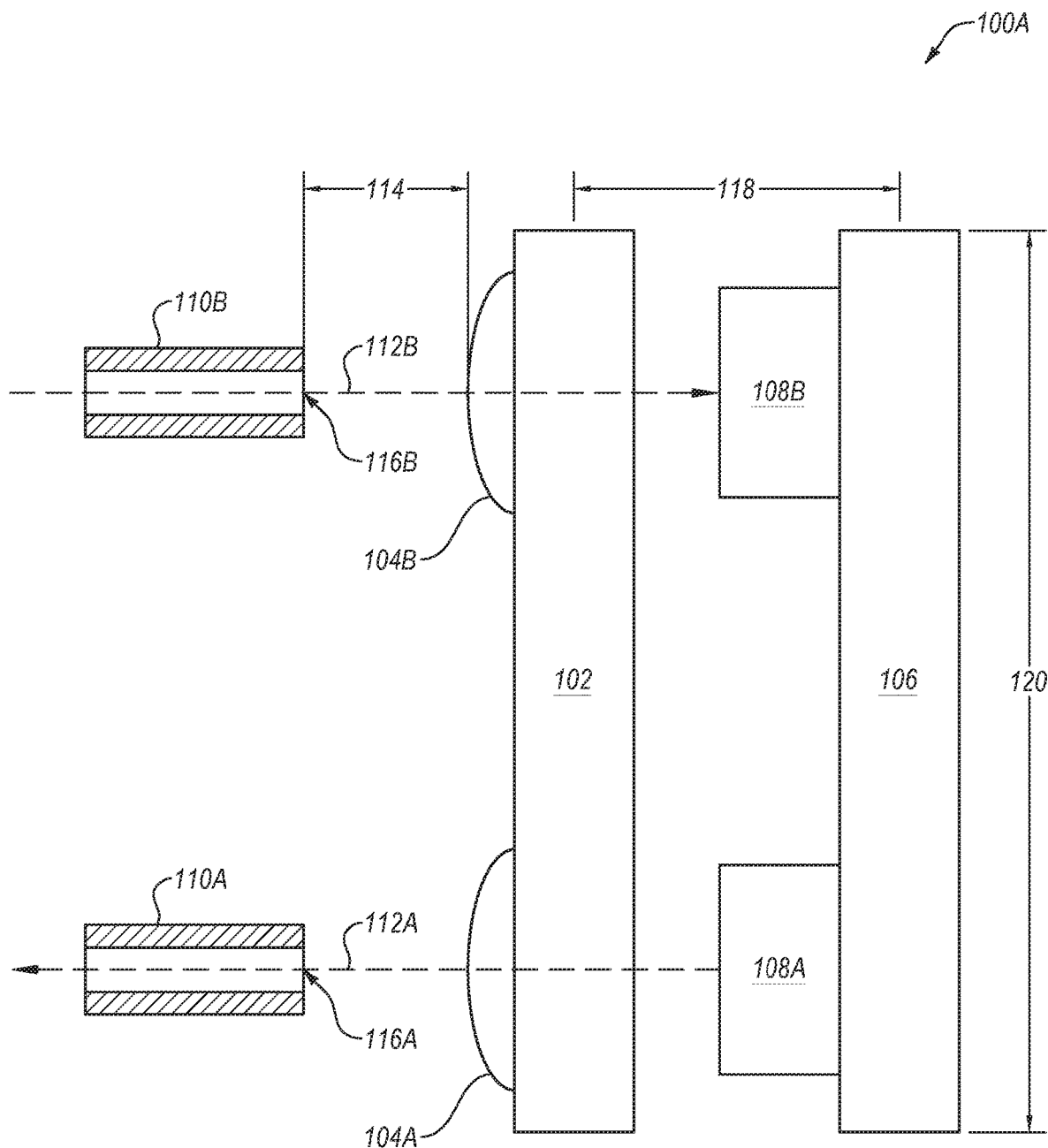
FIG. 1B depicts a block diagram of an example straight-through optics arrangement.

FIG. 1B depicts a portion of an example straight-through optics arrangement 100A (hereinafter, "arrangement 100A"). The arrangement 100A includes a conventional arrangement that may be included in an optical module such as a small form pluggable optical module such as the pluggable optical module 50 of FIG. 1A. The arrangement 100A includes a lens structure 102, that includes two lenses 104A and 104B. The lens structure 102 is positioned adjacent to a flex/stiffener 106 on which active optical components 108A and 108B are positioned. The flex/stiffener 106 may correspond to and may be substantially correspond to the flex/stiffener 54 of FIG. 1A. Optical fibers 110A and 110B are positioned relative to the two lenses 104A and 104B.

In the arrangement 100A of FIG. 1B, a first optical signal 112A may be generated by a first active optical component 108A. The first optical signal 112A may then propagate through the first lens 104A and to the first optical fiber 110A. In an example of the arrangement 100A, the first active optical component 108A may include a vertical cavity surface emitting laser (VCSEL) or another optical source and the first optical fiber 110A may include a core diameter of about 50 microns (µl). The first lens 104A may focus the first optical signal 112A emitted from the VCSEL to the first optical fiber 110A.

Similarly, a second optical signal 112B may be received via a second optical fiber 110B, proceed through the second lens 104B and be received at the second active optical component 108B. In an example of the arrangement 100A, the second active optical component 108B may include a photodetector (PD) and the second optical fiber 110B may include a core diameter of about 50 µm. The second lens 104B may focus the second optical signal 112B emitted from the second optical fiber 110B to the PD.

To ensure the optical signals 112A and 112B are properly received by the second active optical component 108B or properly communicated onto the first optical fiber 110A, a first distance 114 between optical fiber ends 116A and 116B and the lenses 104A and 104B must be small. Similarly, a second distance 118 between the lens structure 102 and the flex/stiffener 106 must also be small. For example, when the first distance 114 and/or the second distance 118 are too large, the first and second optical signals 112A and 112B may be improperly focused at the second active optical component 108B or the first optical fiber 110A.

Moreover, in the optical modules implementing the arrangement 100A of FIG. 1B, a height 120 and width (a perpendicular dimension to the height 120) of the flex/stiffener 106 and/or the lens structure 102 may be limited. For instance, the optical modules may be sized to comply with a MSA. The MSA may define the height 120 such that the optical modules may be properly received in a host structure such as the module shell 58 of FIG. 1A. Accordingly, the arrangement 100A of FIG. 1B may suffer from several deficiencies. For instance, the active optical components 108A and 108B may generate heat during operation. The heat may affect the functionality of the active optical components 108A and 108B. As the number of the active optical components 108A and 108B increases, the amount of total heat also increases because heat from the first optical component 108A may be transferred and thus affect the second optical component 108B and vice versa. Additionally, as the number of optical channels included in optical modules increases, the number of the lenses 104A and 104B, the number of active optical components 108A and 108B, and a number of the optical fibers 110A and 110B increase. Such increases crowd the flex/stiffener 106, especially considering that the height 120 and the width of the flex/stiffener 106 and/or the lens structure 102 may be fixed to comply with the MSA. Crowding causes generation of heat, which may affect operation of the active optical components 108A and 108B. Thus, the arrangement 100A may be limited to a low number (e.g., sixteen) of channels.

Figure 2A:
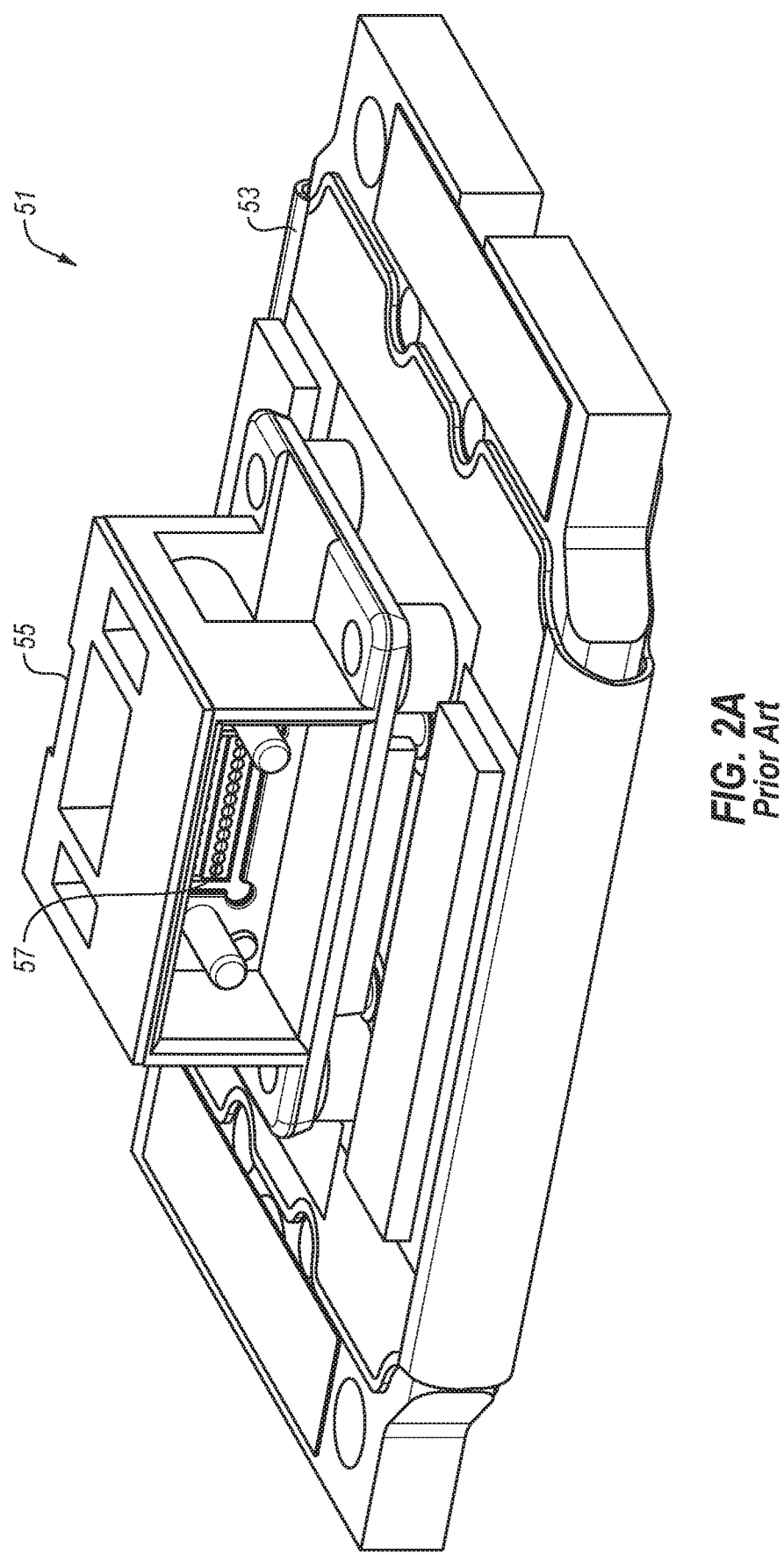
FIG. 2A depicts an example board-mounted optical engine that may implement a board-mounted optics arrangement.

FIG. 2A illustrates a board-mounted optical engine (optical engine) 51. In the optical engine 51 one or more optical components (e.g., optical components 107A and 107B described with reference to FIG. 2B) or some portion thereof are mounted to a flex circuit 53. A lens assembly 55 retains an array of lenses 57. The array of lenses 57 may be substantially similar to the lens structure 102 of FIG. 1B. Optical signals are communicated through the lens assembly 55 to the active optical components on the flex circuit 53. Accordingly, the lens assembly 55 is precisely aligned relative to the flex circuit 53.

Figure 2B:
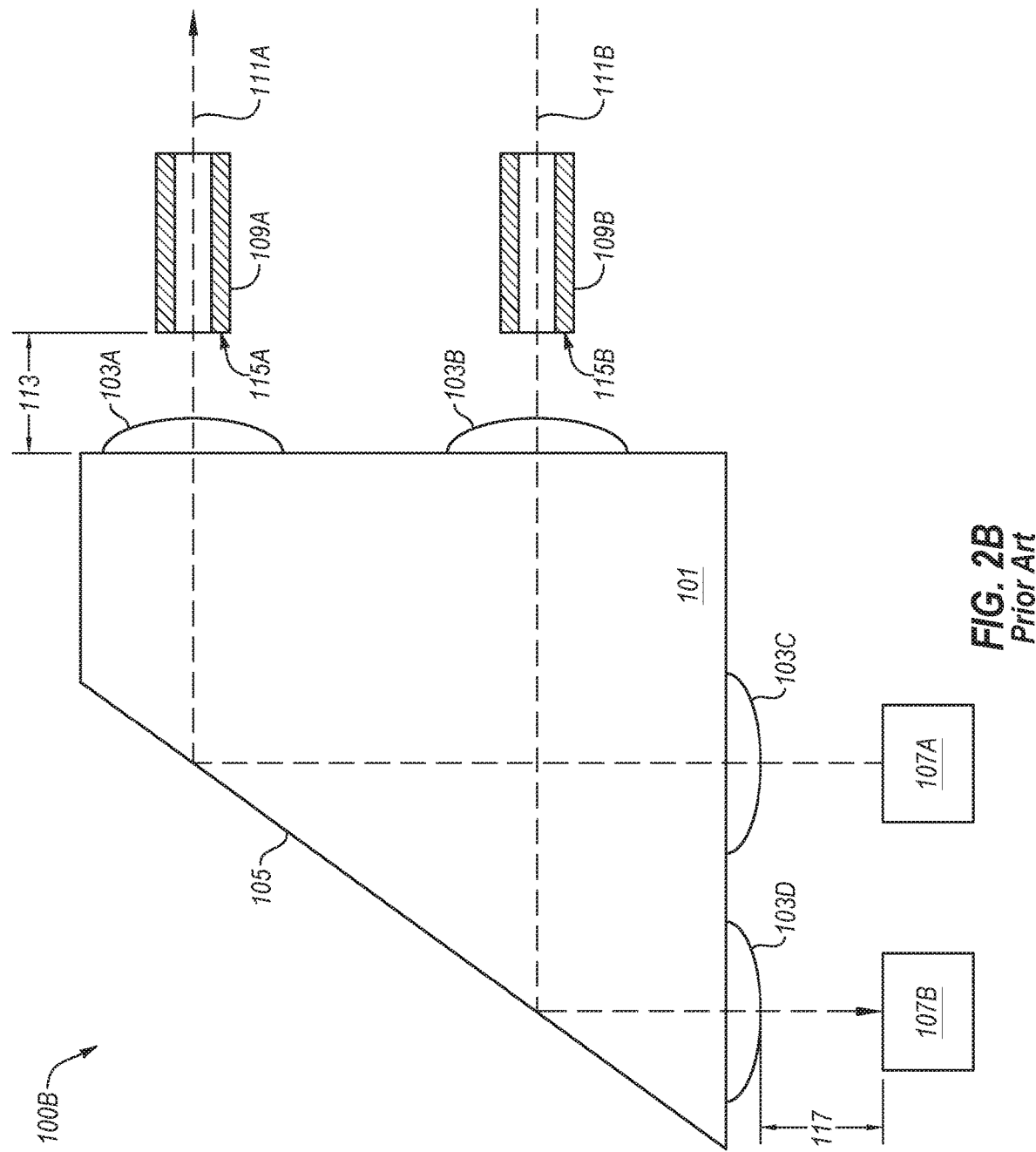
FIG. 2B depicts a block diagram of an example board-mounted optics arrangement that may be implemented in the board-mounted optical engine of FIG. 2A.

FIG. 2B depicts an example board-mounted optics arrangement 100B (hereinafter, "arrangement 100B"). The arrangement 100B includes another conventional arrangement that may be included in a board-mounted optical system such as a board-mounted optical engine (e.g., FINI- SAR® 10G BOA) and the board-mounted optical engine 51 of FIG. 2A. The arrangement 100B includes a lens structure 101 which may substantially correspond to the array of lenses 57 of FIG. 2A. The lens structure 101 may include lenses 103A-103D and an angled mirror 105. A third lens 103C and a fourth lens 103D of the lens structure 101 are positioned adjacent to active optical components 107A and 107B, respectively. Optical fibers 109A and 109B are positioned relative to a first lens 103A and a second lens 103B, respectively.

In the arrangement 100B of FIG. 2B, a first optical signal 111A may be generated by a first active optical component 107A. The first optical signal 111A may then propagate through the third lens 103C, reflect off the angled mirror 105, propagate through the first lens 103A and to the first optical fiber 109A. In an example of the arrangement 100B, the first active optical component 107A may include a VCSEL or another optical source and the first optical fiber 109A may include a core diameter of about 50 μm. The first lens 103A and the third lens 103C may focus the first optical signal 111A emitted from the first active optical component 107A to the first optical fiber 109A.

Similarly, a second optical signal 111B may be received via a second optical fiber 109B, propagate through the second lens 103B, reflect off the angled mirror 105, propagate through the fourth lens 103D and be received at the second active optical component 107B. In an example of the arrangement 100B, the second active optical component 107B may include a PD and the second optical fiber 109B may include a core diameter of about 50 μm. The second lens 103B and the fourth lens 103D may focus the second optical signal 111B emitted from the second optical fiber 109B to the second active optical component 107B.

To ensure the optical signals 111A and 111B are properly received by the second active optical component 107B or properly communicated onto the first optical fiber 109A, a first distance 113 between optical fiber ends 115A and 115B and the first and second lenses 103A and 103B must be small. Similarly, a second distance 117 between the third and fourth lenses 103C and 103D and the active optical components 107A and 107B must also be small. For example, when the first distance 113 and/or the second distance 117 are too large, the first and second optical signals 111A and 111B may be improperly focused at the second active optical component 107B or the first optical fiber 109A.

The arrangement 100B of FIG. 2B may suffer from several deficiencies. For instance, in the arrangement 100B, the lens structure 101 includes a long, unguided optical path. The long, unguided optical path may extend from the end 115A of the first optical fiber 109A through the lens structure 101 and to the first optical component 107A. In some embodiments, a distance between the end 115A of the first optical fiber 109A to the first optical component 107A is about two millimeters (mm). As the optical signals 111A and 111B proceed through the lens structure 101 along the unguided optical path, the optical signals 111A and 111B may be subject to losses.

In the arrangement 100B, the lens structure 101 is subject to manufacturing errors. For example, the angled mirror 105 may be manufactured at an incorrect angle. The incorrect angle may result in reflection of the optical signals 111A and 111B in a direction that may miss or partially miss the first optical fiber 109A or the second active optical component 107B. Missing or partially missing the first optical fiber 109A or the second active optical component 107B may result in loss of signal power, and/or information encoded on the optical signals 111A and 111B.

Additionally, in the arrangement 100B, the lens structure 101 is subject to thermal energy that may result from operation of the optical components 107A and 107B. The thermal energy may cause shape deformations of the lens structure 101. Such shape deformation of the lens structure 101 may cause improper reflection of the optical signals 111A or 111B between the optical fibers 109A and 109B and the optical components 107. The improper reflection may cause losses of signal power, and/or information encoded on the optical signals 111A and 111B.

As described above, the optical fibers 109A and 109B may include a core diameter of about 50 μm and the optical components 107A and 107B may be designed to receive from or to transmit to the optical fibers 109A and 109B. The lens structure 101 may not be able to focus or restrict diameters of the optical signals 111A and 111B. Accordingly, the arrangement 100B of FIG. 2B is limited to transmission of the optical signals 111A and 111B between the optical fibers 109A and 109B with a core diameter of 50 μm and the optical components 107A and 107B designed to receive from or to transmit to the optical fibers 109A and 109B.

In addition, with reference to FIGS. 2A and 2B, the lens assembly 55 is configured to receive an MT ferrule. The MT ferrule may include MT 32 Fiber ferrule, which may be designed to meet the TIA604-18 standard. The MT ferrule may dictate the size and dimensions of the lens assembly 55. Accordingly, the board-mounted optical engine 51 may be sized based on the dimensions of the MT ferrule. Thus, the board-mounted optical engine 51 may be at least large enough to receive the MT ferrule.

Figure 3:
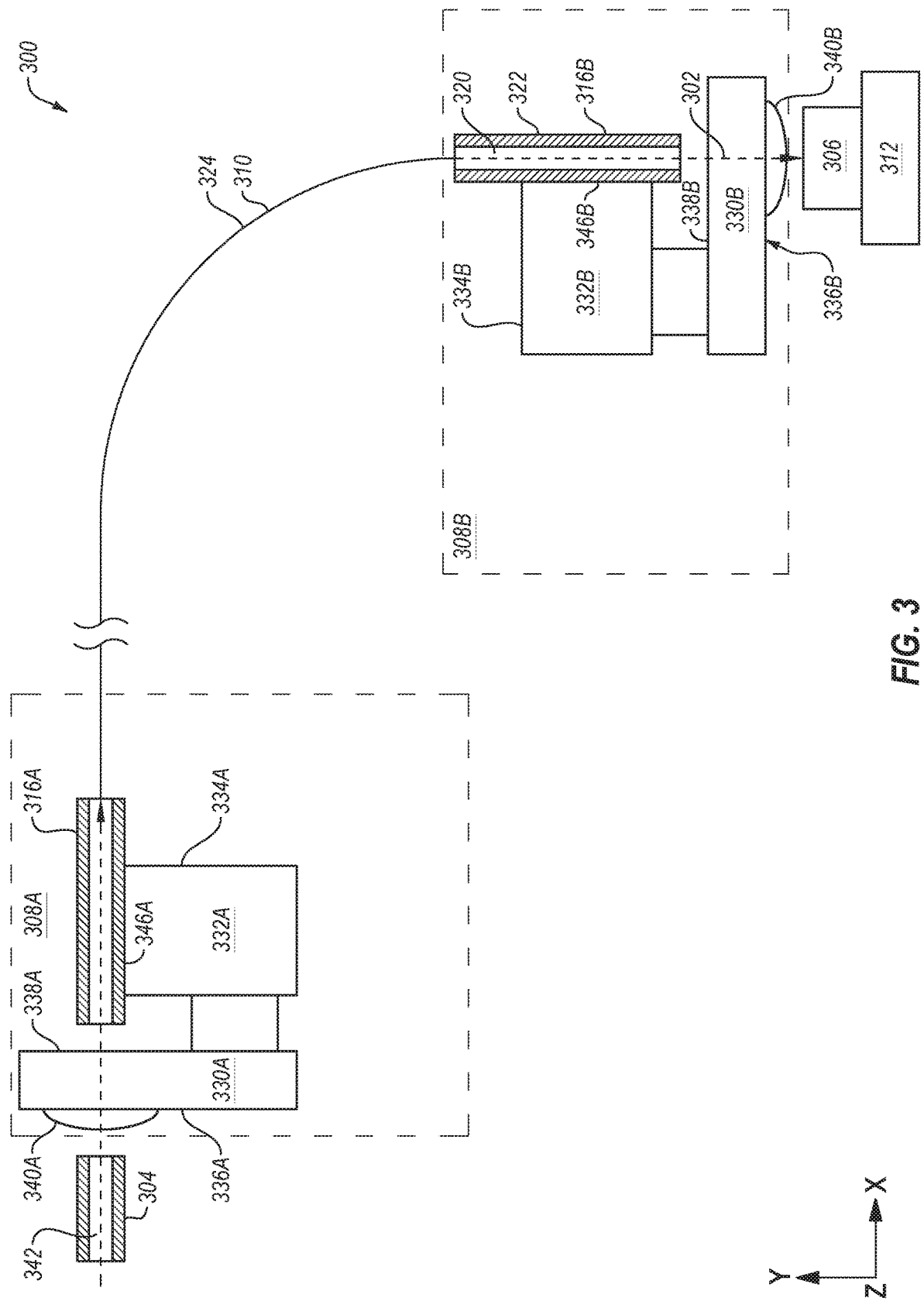
FIG. 3 is a block diagram of an example optical coupling system.

To overcome one or more of the deficiencies described above, optical coupling systems are described. For instance, FIG. 3 is a block diagram of an example optical coupling system 300. The optical coupling system 300 may be implemented in pluggable modules such as the optical module 50 of FIG. 1A and/or optical engines such as the optical engine 51 of FIG. 2A. The optical coupling system 300 is configured to communicate an optical signal 302 between optical fiber 304 and active optical component 306. The optical coupling system 300 may include a first subassembly 308A that is optically coupled via a waveguide 310 to a second subassembly 308B. The waveguide 310 may be configured to optically connect the first subassembly 308A and the second subassembly 308B. For example, the optical signal 302 may be communicated from the second subassembly 308B to the first subassembly 308A via the waveguide 310. The first subassembly 308A may be configured to communicate the optical signal 302 between the optical fiber 304 and the waveguide 310. The second subassembly 308B may be configured to communicate the optical signal 302 between the waveguide 310 and the optical component 306.

In the embodiment of FIG. 3, the optical signal 302 is depicted as traveling from the optical fiber 304 to the active optical component 306. In some embodiments, an optical signal may be communicated from the active optical component 306 to the optical fiber 304.

The optical coupling system 300 may enable a separation between the first subassembly 308A and the second subassembly 308B. The separation may allow for movement of a flex/stiffener 312 away from the optical fiber 304. The flex/stiffener 312 may accordingly be moved to another position within an optical module or a board-mounted optical engine. Repositioning the flex/stiffener 312 may remove a dimensional limitation that may be present near the optical fibers 304. The flex/stiffener 312 may accordingly be larger, which may enable multiple components 306 to be separated from one another which may reduce thermal interference between and/or thermal effect on the components 306. Additionally, a larger flex/stiffener 312 may enable positioning multiple components 306 (e.g., more than sixteen) on the flex/stiffener 312.

For example, in an optical module that implements the optical coupling system 300, the active optical components 306 may be positioned away from a lens assembly structure (e.g., 56 of FIG. 1A). In these embodiments, the active optical components 306 or some portion thereof may be positioned on a flex/stiffener 312 that is placed on a printed circuit board (PCB) (e.g., 52 of FIG. 1A or 406 of FIG. 4 described below). Similarly, in optical engines that implement the optical coupling system 300, the alignment of a lens assembly (e.g., 55 of FIG. 2A) relative to a flex circuit (e.g., 53 of FIG. 2A) is not critical because the waveguide 310 may communicate optical signals without having the optical components and the lenses being aligned. Some additional details of implementation in an optical module or an optical engine are provided elsewhere in the present disclosure.

The waveguide 310 includes a first waveguide end 316A and a second waveguide end 316B. In FIG. 3, sectional views of the first waveguide end 316A, the second waveguide end 316B, (collectively, waveguide ends 316) are depicted. For example, in each of the waveguide ends 316, a core 320 and a cladding portion 322 are depicted. Between the waveguide ends 316 the waveguide 310 may include a central portion 324. Although not shown in FIG. 3, the central portion 324 may include a core similar to the core 320 and a cladding portion similar to the cladding portion 322.

In some embodiments, diameters of the core 320 may be substantially constant between the waveguide ends 316. For instance, the diameter of the core 320 may be substantially constant from the first waveguide end 316A to the second waveguide end 316B. In these and other embodiments, the core 320 of the waveguide 310 may include a diameter of about 50 μm. In some embodiments, the diameters of the core 320 may vary between the waveguide ends 316. In these embodiments, variation of the diameters of the core 320 may be configured to focus the optical signal 302 as the optical signal 302 propagates along the waveguide 310. For example, a diameter of the core 320 at the first waveguide end 316A of the waveguide 310 may be about 60 μm. In addition, a diameter of the core 320 at the second waveguide end 316B of the waveguide 310 may be about 40 μm. Accordingly, as the optical signal 302 propagates, the optical signal 302 may be tapered down. Alternatively, if the optical signal 302 is configured to propagate from the second waveguide end 316B to the first waveguide end 316A, the diameters may be reversed.

In some embodiments, the waveguide 310 may be arced. The arc of the waveguide 310 may enable the first subassembly 308A to be positioned at a different orientation relative to the second subassembly 308B. For example, in the embodiment of FIG. 3, the first subassembly 308A may be substantially perpendicular relative to the second subassembly 308B or may be oriented at another angle relative to the second subassembly 308B. The arc of the waveguide 310 may be quantified according to a bending radius. The bending radius of the waveguide 310 may be about two millimeters (mm) in some embodiments. In other embodiments, the bending radius may be greater than two mm or less than two mm.

The waveguide 310 may be comprised of a flexible material. For example, the waveguide 310 may be comprised of a polymer. The polymer may be include a flexible polymer such as a printable polymer or another suitable polymer.

In the embodiment of FIG. 3, the optical signal 302 may enter the waveguide 310 at the first waveguide end 316A. The optical signal 302 may be communicated along the central portion 324 to the second waveguide end 316B. Alternatively, the optical signal 302 may enter the waveguides 310 at the second waveguide end 316B. The optical signal 302 may be communicated along the central portion 324 to the first waveguide end 316A.

The first subassembly 308A may be located near the optical fiber 304. For instance, a distance between the first subassembly 308A and the optical fiber 304 may correspond to and may be substantially similar to the distance 114 in pluggable modules such as the pluggable optical module 50 of FIG. 1A. The distance between the first subassembly 308A and the optical fiber 304 may be small enough to reduce or eliminate coupling losses, which may be introduced between the first subassembly 308A and the optical fiber 304.

The first subassembly 308A may be configured to communicate the optical signal 302 from the optical fiber 304 to the waveguide 310. For example, in this and other embodiments, the optical fiber 304 may be configured to transmit the optical signal 302 to the waveguide 310 through the first subassembly 308A.

In the embodiment of FIG. 3, the second subassembly 308B may be located near the active optical component 306. The second subassembly 308B may be configured to communicate the optical signal 302 between the active optical component 306 and the waveguide 310. For example, in this and other embodiments, active optical component 306 may be configured to generate the optical signal 302 and transmit the optical signal 302 to the waveguide 310 through the second subassembly 308B.

The second subassembly 308B may be located near the active optical component 306. For instance, a distance between the second subassembly 308B and the active optical component 306 may correspond to and may be substantially similar to the distance 118 in pluggable modules such as the pluggable optical module 50 of FIG. 1A. The distance between the second subassembly 308B and the active optical component 306 may be small enough to reduce or eliminate coupling losses, which may be introduced between the second subassembly 308A and the active optical component 306.

The first subassembly 308A may include a first lens holder 334A and the second subassembly 308B may include a second lens holder 334B (generally, lens holder 334 or lens holders 334). The lens holders 334 may include a lens retention portion 330A and 330B, (generally, lens retention portion 330 or lens retention portions 330) and a waveguide retention portion 332A and 332B (generally, waveguide retention portion 332 or waveguide retention portions 332). The lens retention portions 330 are configured such that the optical signals 302 are transmissible through the lens retention portions 330. For example, the lens retention portions 330 may be transparent or substantially transparent. The lens retention portions 330 may include a first surface 336A and 336B (generally, first surface 336 or first surfaces 336). The first surface 336 may be oriented to face a first direction that is oriented away from the waveguide ends 316. The lens retention portions 332 may also include a second surface 338A and 338B (generally, second surface 338 or second surfaces 338). The second surface 338 may be opposite the first surface 336 and may be oriented to face a second direction that is oriented towards the waveguide ends 316. For example, the waveguide ends 316 may be adjacent to the second surface 338.

The first subassembly 308A and the second subassembly 308B may include one or more lenses 340A and 340B (generally, lens 340 or lenses 340). In the embodiment of FIG. 3, the lenses 340 are positioned on the first surface 336. In other embodiments, the lenses 340 may be positioned on the second surface 338 of the lens retention portions 330. In, FIG. 3, both the first lens 340A and the second lens 340B are positioned on the first surface 336 of the lens retention portions 330. In some embodiments, one or both of the lenses 340 may be positioned on the second surface 338 of the lens retention portions 330. In the present disclosure, the term "positioned on" may include a lens 340 that is attached to the lens retention portions 330 through any suitable means, or a lens 340 that is formed with as an integral component of or in the lens retention portions 330.

In the embodiment of FIG. 3, a first lens 340A is attached to the first surface 336A of the lens retention portion 330A of the first lens holder 334A. The first lens 340A is positioned relative to the first optical fiber 304 such that an optical fiber core 342 of the first optical fiber 304 is aligned with the first lens 340A. In addition, the first lens 340A is positioned relative to the waveguide 310 such that the core 320 of the waveguide 310 is aligned to the first lens 340A. The optical signal 302 may accordingly be communicated between the waveguide 310 and the optical fiber 304 through the first lens 340A and the lens retention portion 330. In the present disclosure, the term "aligned" may indicate that a physical positioning of two objects relative to one another enables communication of the optical signal 302 therebetween. In the present disclosure, when discussing the "alignment" of a lens 340A or 340B with another optical component (e.g., 306), the lens 340A or 340B may be configured to focus a light signal to or from the optical component.

A second lens 340B is attached to the first surface 336B of the lens retention portion 330B of the second lens holder 334B. The second lens 340B is positioned relative to the waveguide 310 and the component 306. For example, the second lens 340B may be aligned relative to the waveguide 310 and the component 306 such that the optical signal 302 may be communicated between the component 306 and the waveguide 310 through the lens retention portion 330 and the second lens 340B.

The waveguide retention portions 332 may be configured to retain the waveguide ends 316 relative to the lens retention portions 330. For example, in the depicted embodiment, the waveguide retention portion 332A of the first lens holder 334A may retain the first waveguide end 316A of the waveguide 310. Additionally, in the depicted embodiment, the waveguide retention portion 332B of the second lens holder 334B may retain the second waveguide end 316B of the waveguide 310.

In some embodiments, the waveguide ends 316 may be affixed to the waveguide retention portions 332 using an epoxy or another suitable connective medium. The waveguide retention portions 332A and 332B may have an edge 346A and 346B respectively (generally, edge 346 or edges 346). In these and other embodiments, the waveguide retention portions 332 may define V-grooves along edges 346 of the waveguide retention portions 332. In other embodiments, the waveguide ends 316 may be affixed to the waveguide retention portions 332 using another suitable attachment mechanism (e.g., fasteners, etc.). In addition, the waveguide retention portion 332 may be integrally formed (e.g., a single structure) with one or more waveguide ends 316.

The waveguide retention portions 332 may be configured for alignment between the waveguide ends 316, the lenses 340, and the optical fiber 304 or between the waveguide ends 316, the lenses 340, and the active optical component 306. For example, in the first lens holder 334A, the edge 346A may be positioned such that the core 320 of the waveguide end 316A is aligned with the lens 340A and the optical fiber core 342 of the optical fiber 304. In addition, in the second lens holder 334B, the edge 346B may be positioned such that the cores 320 of the waveguide end 316B is aligned with the lens 340B and the active optical components 306. Such alignment enables communication of the optical signals 302 through the optical coupling system 300.

In some embodiments, there may be a distance between the waveguide ends 316 and the second surface 338 of the lens retention portion 330. In some of these embodiments, a matching gel may be applied to a volume between the waveguide ends 316 and the second surface 338. Additionally or alternatively, in embodiments in which one or more of the lenses 340 are positioned on the second surface 338, the matching gel may be applied to the volume between the waveguide ends 316 and the one or more lenses 340.

In the embodiment of FIG. 3, one waveguide 310, one optical fiber 304, two lenses 340, and one active optical component 306 are illustrated. Accordingly, in the depicted embodiment, the optical coupling system 300 may be configured to communicate a single optical signal 302.

Some embodiments may be configured to communicate two or more optical signals. In these and other embodiments, the optical coupling system 300 may include two or more waveguides (similar to waveguide 310), two or more optical fibers (similar to optical fiber 304), four or more lenses (similar to lenses 340), and two or more active optical components (similar to the components 306). For example, the optical coupling system 300 may be configured to communicate N optical signals. Embodiments configured to communicate the N optical signals may include N waveguides (similar to waveguide 310), N optical fibers (similar to optical fiber 304), 2*N lenses (similar to lenses 340), and N optical components (similar to the components 306). Embodiments configured to communicate N optical signals may include components that are stacked in the z-direction of FIG. 3.

In some embodiments, the optical coupling system 300 may include multiple waveguides 310 configured to communicate multiple optical signals 302 between multiple optical fibers 304 and multiple active optical components 306. The multiple waveguides 310 may enable the positioning of the multiple active optical components 306 away from the multiple optical fibers 304 and/or a portion of a module configured to receive the multiple optical fibers 304. In addition, the multiple waveguides 310 may enable the orienting of the multiple active optical components 306 independently or substantially independently of the optical fibers 304. The optical coupling system 300 may enable individual optical paths, e.g. through the multiple waveguides 310 between the optical fibers 304 and the active optical components 306. In some embodiments, the individual optical paths may not be parallel. For example, a first optical fiber may sit in the plane of the drawing of FIG. 3, and a second optical fiber may be a first distance from the first optical fiber in the z-direction. And, a first optical component may sit in the plane of the drawing of FIG. 3, and a second optical component may be a second distance from the first optical component in the x-direction, the y-direction, and/or the z-direction. The second distance may be different from the first distance. The individual optical paths may enable multiple active optical components 306 to be separated from one another by distances different from the separation between the multiple optical fibers which may reduce thermal interference between the multiple active optical components 306.

For example, multiple optical fibers 304 may be stacked in the z-direction with little or no offset in the x-direction and the y-direction. The multiple active optical components 306 optically coupled to the multiple optical fibers 304 through multiple waveguides 310 may sit in an xz-plane. The multiple active optical components 306 may be positioned offset from one another in the x-direction and the z-direction.

In addition, FIG. 3 depicts the optical signal 302 communicated from the optical fiber 304 to the active optical component 306. In some embodiments, the optical coupling system 300 may be configured to transmit the optical signal 302 from the active optical component 306 to the optical fiber 304. In embodiments including N optical signals, one or more of the optical signals may be communicated to the optical fiber(s) 304 (e.g., transmitted from the active optical component(s) 306) and one or more of the optical signals may be communicated to the active optical component(s) 306 from optical fiber(s) 304.

Figure 4:
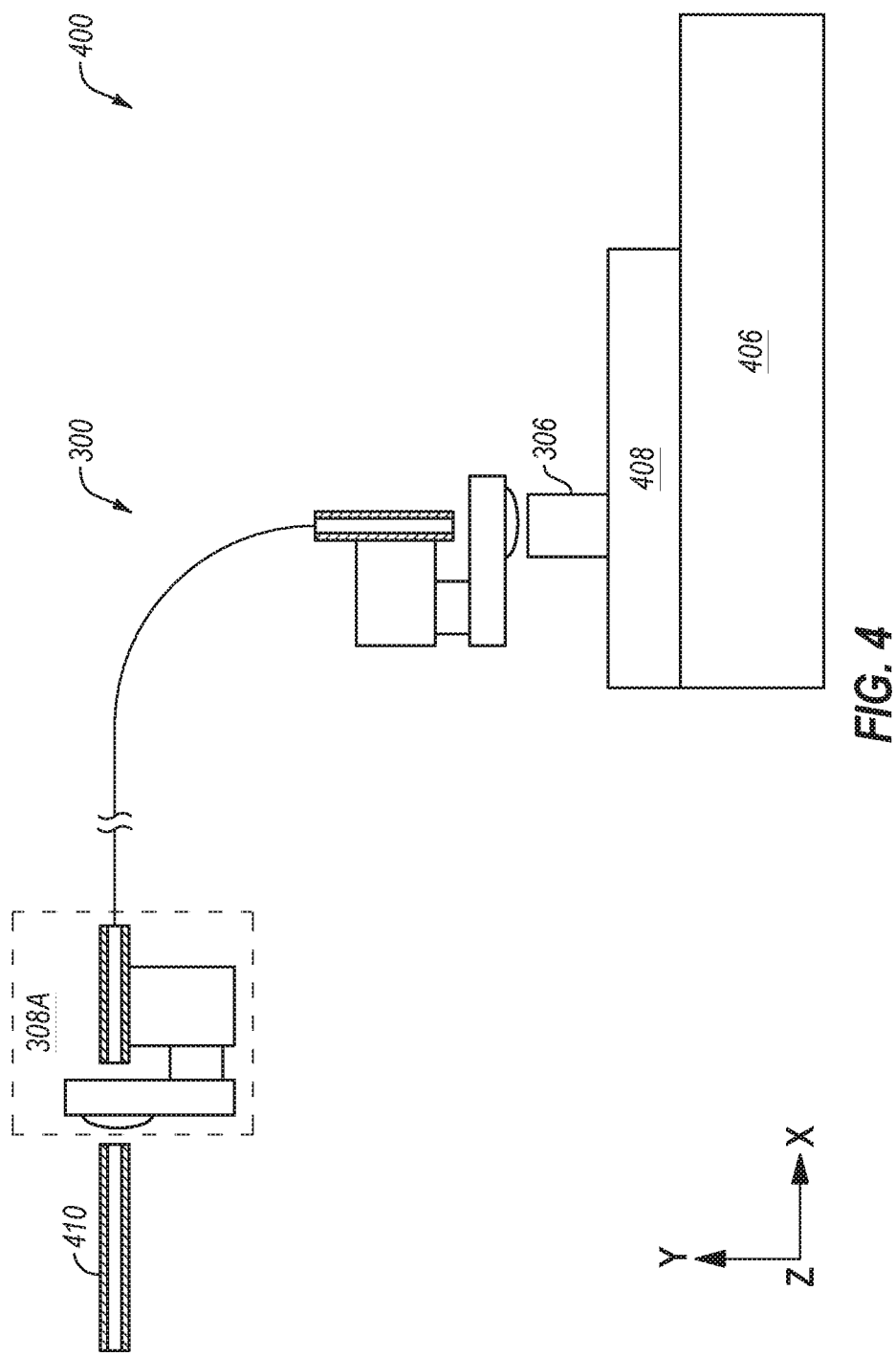
FIG. 4 illustrates an exploded view of an example optical module in which the optical coupling system of FIG. 3 is implemented.

FIG. 4 depicts a portion of an example optical module 400 in which the optical coupling system 300 may be implemented. The portion of the optical module 400 may include a portion of an optical module, which may be similar to the optical module 50 of FIG. 1A. For instance, the optical module 400 of FIG. 4 may include a CXP module or other optical modules that may be pluggable. In some embodiments, the optical coupling system 300, as shown in FIG. 4 may be housed in a module housing. The module housing may be compliant with C form factor pluggable multi-source agreement (MSA) or another MSA. A lens retention superstructure and a plug retaining the optical fibers 410 are omitted from FIG. 4.

A portion of the optical module 400 includes a printed circuit board (PCB) 406. The PCB 406 of FIG. 4 may correspond to and may be substantially similar to the PCB 52 of FIG. 1A. Additionally, FIG. 4 depicts an optical fiber 410 that is positioned relative to the optical coupling system 300. In some embodiments, the optical fibers 410 may be included in a ribbon that includes the optical fibers 410.

In the portion of the optical module 400, the optical component 306 is mounted to a flex/stiffener 408. The flex/stiffener 408 may be separated from and generally positioned away the first subassembly 308A and the optical fiber 410. The active optical component 306 may accordingly be separated from the optical fiber 410. For instance, the flex/stiffener 408 is positioned substantially parallel to and/or mounted to the PCB 406. In other embodiments, the flex/stiffener 408 and the optical component 306 may be placed in another location in the optical module 400. For instance, the flex/stiffener 408 may be positioned at an opposite end of the optical module 400 from the optical fiber 410.

The location of the flex/stiffener 408 may be independent or substantially independent of the optical fibers 410. Accordingly, flexibility in design of the optical module 400 may be improved through use of the optical coupling system 300. In particular, the active optical component 306 may be positioned on the flex/stiffener 408, which may be located throughout the optical module 400. Moreover, in embodiments with multiple active optical components 306, the active optical components 306 may be located at two or more different locations throughout the optical module 400. The active optical components 306 may be separated, which may reduce or eliminate transfer of thermal energy between the active optical components 306.

Figure 5:
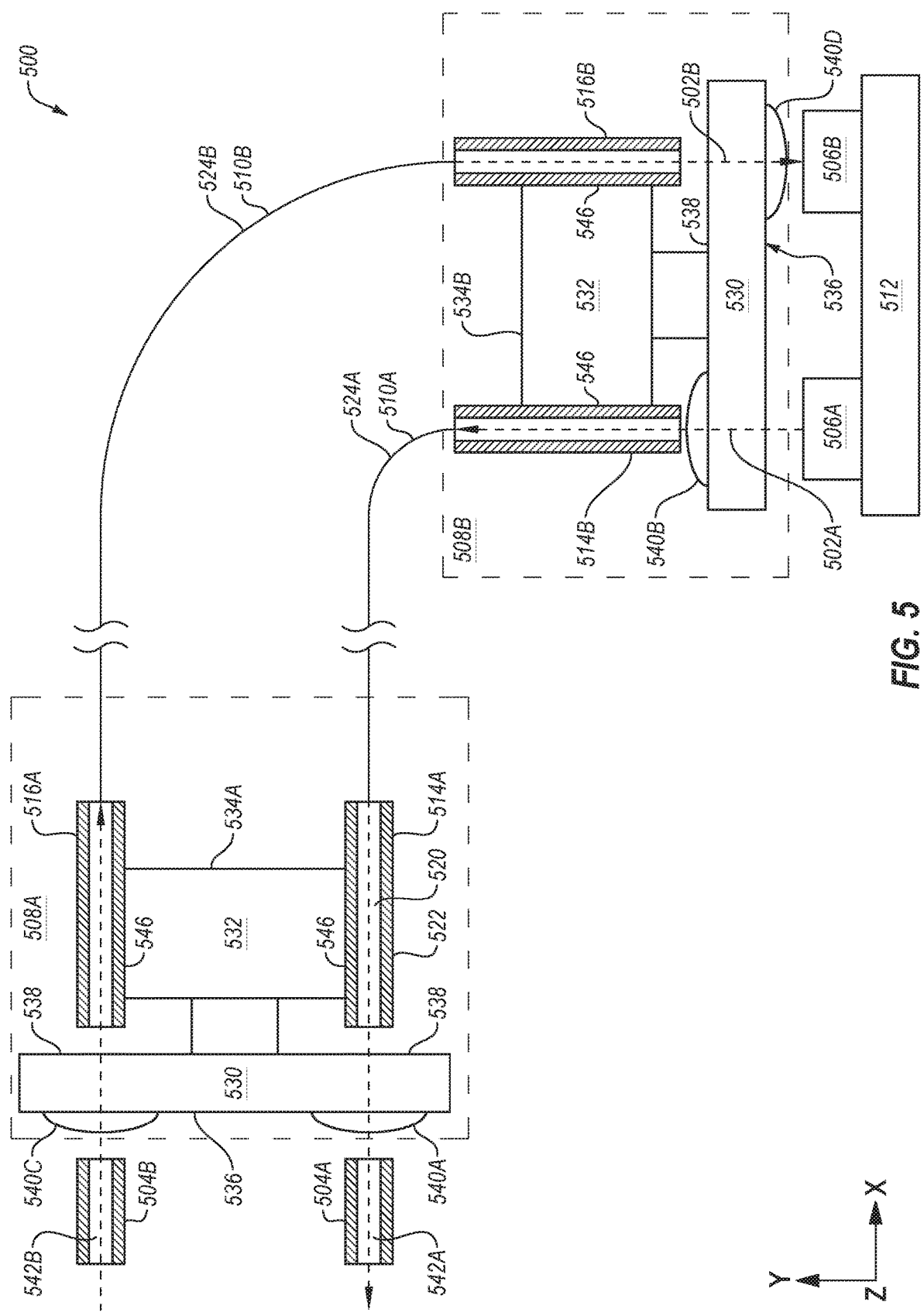
FIG. 5 is a block diagram of another example optical coupling system.

FIG. 5 is a block diagram of another example optical coupling system 500. The optical coupling system 500 may be similar to the optical coupling system 300 of FIG. 3. For instance, the optical coupling system 500 is configured to communicate optical signals 502A and 502B (generally, optical signal 502 or optical signals 502) between optical fibers 504A and 504B (generally, optical fiber 504 or optical fibers 504) and active optical components 506A and 506B (generally, component 506 or components 506).

The optical coupling system 500 may include a first subassembly 508A that is optically coupled via one or more waveguides 510A and 510B (generally, waveguide 510 or waveguides 510) to a second subassembly 508B. The optical coupling system 500 enables separation between the first subassembly 508A and the second subassembly 508B. The separation may allow for movement of the active optical components 506A and 506B away from the optical fibers 504. The active optical components 506A and 506B may accordingly be moved to another position within an optical module or a board-mounted optical engine. Repositioning the active optical components 506A and 506B may remove a dimensional limitation that may be present near the optical fibers 504. A flex circuit 512 or another structure on which the active optical components 506A and 506B are mounted may accordingly be larger, which may enable the components 506 to be separated from one another which may reduce thermal interference between the components 506. Additionally, a larger flex circuit 512 may enable positioning multiple components 506 (e.g., greater than twenty-four).

In the embodiment of FIG. 5, the waveguides 510 optically connect the first subassembly 508A and the second subassembly 508B. For example, a first optical signal 502A may be communicated from the second subassembly 508B to the first subassembly 508A via the first waveguide 510A. Similarly, the second optical signal 502B may be communicated from the first subassembly 508A to the second subassembly 508B. The waveguides 510 enable the positioning of the components 506 away from the optical fibers 504 and/or a portion of a module configured to receive the optical fibers. In addition, the waveguides 510 enable the orientation of the components 506 independently or substantially independently of the optical fibers 504.

For example, in optical engines or other suitable modules that implement the optical coupling system 500, the alignment of a lens assembly (e.g., 51 of FIG. 2A) relative to a flex circuit (e.g., 53 of FIG. 2A) is not critical because the waveguides 510 can communicate optical signals without having the optical components and the lenses of the lens assembly aligned. Some additional details of implementation in an optical engine are provided elsewhere in this disclosure.

The first waveguide 510A includes a first waveguide end 514A and a second waveguide end 514B. The second waveguide 510B includes a first waveguide end 516A and a second waveguide end 516B. In FIG. 5, sectional views of the first waveguide end 514A, the second waveguide end 514B, the first waveguide end 516A, and the second waveguide end 516B (collectively, waveguide ends 514/516) are depicted. For example, in each of the waveguide ends 514/516, a core 520 and a cladding portion 522 are depicted. The core 520 and the cladding portion 522 are only labeled on the first waveguide end 514A of the first waveguide 510A. Between the waveguide ends 514/516 the first waveguide 510A and the second waveguide 510B may include central portions 524A and 524B. Although not shown in FIG. 5, the central portions 524A and 524B include a core similar to the core 520 and a cladding portion similar to the cladding portion 522.

In some embodiments, diameters of the cores 520 may be substantially constant between the waveguide ends 514/516. For instance, the diameter of the core 520 may be substantially constant from the first waveguide end 516A to the second waveguide end 516B. In these and other embodiments, the cores 520 of the first waveguide 510A and/or the second waveguide 510B may include a diameter of about 50 µm. In some embodiments, the diameters of the cores 520 may vary between the waveguide ends 514/516. In these embodiments, variation of the diameters of the cores 520 may focus the optical signals 502A and 502B as the optical signals 502A and 502B propagate along the first waveguide 510A and/or the second waveguide 510B. For example, a diameter of the core 520 at the first waveguide end 516A of the second waveguide 510B may be about 60 µm. In addition, a diameter of the core 520 at the second waveguide end 516B of the second waveguide 510B may be about 40 µm. Accordingly, as the second optical signal 502B propagates, the second optical signal 502B may be tapered down. Similarly, a diameter of the core 520 at the second waveguide end 514B of the first waveguide 510A may be about 60 µm. In addition, a diameter of the core 520 at the first waveguide end 514A of the first waveguide 510A may be about 40 µm. Accordingly, as the first optical signal 502A propagates, the first optical signal 502A may be tapered down.

In some embodiments, the first waveguide 510A and the second waveguide 510B may be arced. The arc of the first waveguide 510A and the second waveguide 510B may enable the first subassembly 508A to be positioned at a different orientation relative to the second subassembly 508B. For example, in the embodiment of FIG. 5, the first subassembly 508A may be substantially perpendicular relative to the second subassembly 508B or may be oriented at another angle relative to the second subassembly 508B. The arc of the first waveguide 510A and the second waveguide 510B may be quantified according to a bending radius. The bending radius of the first waveguide 510A and the second waveguide 510 may be about two mm in some embodiments. In other embodiments, the bending radius may be greater than two mm or less than two mm. In some embodiments, the bending radius of the waveguide 510A may be different from the bending radius of the waveguide 510B. For example, the bending radius of the waveguide 510B may be greater than the bending radius of the waveguide 510A.

The first waveguide 510A and the second waveguide 510B may be comprised of a flexible material. For example, the first waveguide 510A and the second waveguide 510B may be comprised of a polymer.

In the embodiment of FIG. 5, the first optical signal 502A may be generated by the first component 506A. The first optical signal 502A may then enter the first waveguide 510A at the second waveguide end 514B. The first optical signal 502A may then be communicated along the central portion 524A of the first waveguide 510A to the first waveguide end 514A. Similarly, the second optical signal 502B may enter the second waveguide 510B at the first waveguide end 516A. The second optical signal 502B may be communicated along the central portion 524 to the second waveguide end 516B.

The first subassembly 508A is located near the optical fibers 504. The first subassembly 508A may be configured to communicate the optical signals 502 with the optical fibers 504. For example, in this and other embodiments, a first component 506A may include a VCSEL or another optical source. A first optical signal 502A may be communicated from the first subassembly 508A to a first optical fiber 504A. Additionally, in this and other embodiments, a second component 506B may be a PD. The first subassembly 508A may receive a second optical signal 502B from the second optical fiber 504B.

In the embodiment of FIG. 5, the second subassembly 508B may be located near the components 506. The second subassembly 508B may be configured to communicate the optical signals with the components 506. For example, in this and other embodiments, the first optical signal 502A may be received by the second subassembly 508B from the VCSEL. Additionally, in this and other embodiments, the second subassembly 508B may communicate the second optical signal 502B to the PD.

The first subassembly 508A may include a first lens holder 534A and the second subassembly 508B may include a second lens holder 534B (generally, lens holder 534 or lens holders 534). The lens holder 534 may include a lens retention portion 530 and a waveguide retention portion 532. The lens retention portions 530 are configured such that the optical signals 502 are transmissible through the lens retention portions 530. For example, the lens retention portions 530 may be transparent or substantially transparent. The lens retention portions 530 include a first surface 536. The first surface 536 may be oriented to face away from the waveguide ends 514/516. The lens retention portions 530 include a second surface 538. The second surface 538 is opposite the first surface 536 and may be oriented to face towards the waveguide ends 514/516. For example, the waveguide ends 514/516 may be adjacent to the second surface 538.

The first subassembly 508A and the second subassembly 508B may include one or more lenses 540A-540D (generally, lens 540 or lenses 540). The lenses 540 may be positioned on the first surface 536 of the lens retention portions 530. In the embodiment of FIG. 5, a first lens 540A is attached to the first surface 536 of the lens retention portion 530 of the first lens holder 534A. The first lens 540A is positioned relative to the first optical fiber 504A such that a core 542A of the first optical fiber 504A is aligned to the first lens 540A. In addition, the first lens 540A is positioned relative to the first waveguide 510A such that the core 520 of the first waveguide 510A is aligned to the first lens 540A. The first optical signal 502A may accordingly be communicated from the first waveguide 510A through the lens retention portion 530, through the first lens 540A and onto the first optical fiber 504A.

A second lens 540B is attached to the second surface 538 of the lens retention portion 530 of the second lens holder 534B. The second lens 540B is positioned relative to the first waveguide 510A and the first component 506A. For example, the second lens 540B may be aligned relative to the first waveguide 510A and the first component 506A such that the first optical signal 502A may be communicated from the first component 506A to the second waveguide end 514B via the second lens 540B.

A third lens 540C is attached to the first surface 536 of the lens retention portion 530 of the lens holder 534A. The third lens 540C is positioned relative to the second optical fiber 504B such that a core 520 of the second optical fiber 504B is aligned to the third lens 540C. In addition, the third lens 540C is positioned relative to the second waveguide 510B such that the core 520 of the second waveguide 510B is aligned to the third lens 540C. The second optical signal 502B may accordingly be communicated from the second optical fiber 504B through the third lens 540C, through the lens retention portion 530, and onto the second waveguide 510B.

A fourth lens 540D is attached to the first surface 536 of the lens retention portion 530 of the second lens holder 534B. The fourth lens 540D is positioned relative to the second waveguide 510B and the second component 506B. For example, the fourth lens 540D may be aligned relative to the second waveguide 510B and the second component 506B such that the second optical signal 502B may be communicated from the second waveguide end 516B of the second waveguide 510B, through the lens retention portion 530, through the fourth lens 540D, and to the second component 506B.

The lens holders 534 may include a waveguide retention portion 532. The waveguide retention portion 532 may be configured to retain the waveguide ends 514/516 relative to the lens retention portion 530. For example, in the depicted embodiment, the waveguide retention portion 532 of the first lens holder 534A may retain the first waveguide end 514A of the first waveguide 510A and the first waveguide end 516A of the second waveguide 510B. Additionally, in the depicted embodiment, the waveguide retention portion 532 of the second lens holder 534B may retain the second waveguide end 514B of the first waveguide 510A and the second waveguide end 516B of the second waveguide 510B.

In some embodiments, the waveguide ends 514/516 may be affixed to the waveguide retention portions 532 using an epoxy. In these and other embodiments, the waveguide retention portions 532 may define V-grooves along edges 546 of the waveguide retention portions 532. In other embodiments, the waveguide ends 514/516 may be affixed to the waveguide retention portions 532 using another suitable attachment mechanism (e.g., fasteners, etc.). In addition, the waveguide retention portion 532 may be integrally formed (e.g., a single structure) with one or more waveguide ends 514/516.

The waveguide retention portions 532 may be configured for alignment between the waveguide ends 514/516, the lenses 540, and the optical fibers 504 or between the waveguide ends 514/516, the lenses 540, and the components 506. For example, in the first lens holder 534A, a lateral dimension between the edges 546 may be sized such that the cores 520 of the waveguide ends 514/516 are aligned with the lenses 540 and the optical fibers 504. In addition, in the second lens holder 534B, a lateral dimension between the edges 546 may be sized such that the cores 520 of the waveguide ends 514/516 are aligned with the lenses 540 and the components 506. Such alignment enables communication of the optical signals 502 through the optical coupling system 500.

In some embodiments, there may be a distance between the waveguide ends 514/516 and the second surface 538 of the lens retention portion 530. In some of these embodiments, a matching gel may be applied to a volume between the waveguide ends 514/516 and the second surface 538. Additionally or alternatively, in embodiments in which one or more of the lenses 540 are positioned on the second surface 538, the matching gel may be applied to the volume between the waveguide ends 516 and the one or more lenses 540.

The optical coupling system 500 may include two optical fibers 504 in the xy-plane, which may be separated by a first distance. The optical coupling system 500 may accordingly, include two waveguides 510 that may optically couple to the optical fibers 504 in the first subassembly 508A in the same xy-plane. However, like the optical coupling system 300, the waveguide 510A may connect to the second subassembly 508B at a distance in the x-direction, the y-direction, and/or the z-direction from where the waveguide 510B connects to the second subassembly 508B. Additionally or alternatively, the active optical components 506 may be in the same xy-plane, or the active optical components 506 may be offset in the z-direction.

Similar to the optical coupling system 300, the optical coupling system 500 may include additional optical fibers 504, waveguides 510, and active optical components 506 that may be stacked in the z-direction. Multiple waveguides 510 may provide for individual optical paths which may allow for separating the active optical components 506 in directions and distances that are not the same as the separation between the optical fibers 504. For example, the distance in the x-direction between the active optical component 506A and the active optical component 506B may be greater than the distance in the y-direction between the optical fiber 504A and the optical fiber 504B. Additionally or alternatively, the active optical component 506A and the active optical component 506B may be separated in the z-direction. The individual optical paths may enable the active optical components 506 to be separated from one another by distances different from the separation between the multiple optical fibers which may reduce thermal interference between the active optical components 506.

The second lens 540B is illustrated on the second surface 538B of the lens retention portion 530B. As with the optical coupling system 300, the lenses 540 of the optical coupling system 500 may be positioned on the first surfaces 536 or the second surfaces 538. Additionally or alternatively, the lenses 540 may be positioned or formed within the lens retention portions 530.

In the embodiment of FIG. 5, two waveguides 510A and 510B, two optical fibers 504A and 504B, four lenses 540A, 540B, 540C, and 540D, and two active optical components 506A and 506B are illustrated. The embodiment of FIG. 5 may accordingly enable communication of the first optical signal 502A and the second optical signal 502B. In some embodiments, the optical coupling system 500 may be configured to communicate a single optical signal. Embodiments configured to communicate the single optical signal may include one waveguide (similar to waveguide 510), one optical fiber (similar to optical fiber 504), two lenses (similar to lenses 540), and one optical component (similar to the components 506).

In some embodiments, the optical coupling system 500 may be configured to communicate more than two optical signals. For example, the optical coupling system 500 may be configured to communicate N optical signals. Embodiments configured to communicate the N optical signals may include N waveguides (similar to waveguide 510), N optical fibers (similar to optical fiber 504), 2*N lenses (similar to lenses 540), and N optical components (similar to the components 506).

Figure 6:
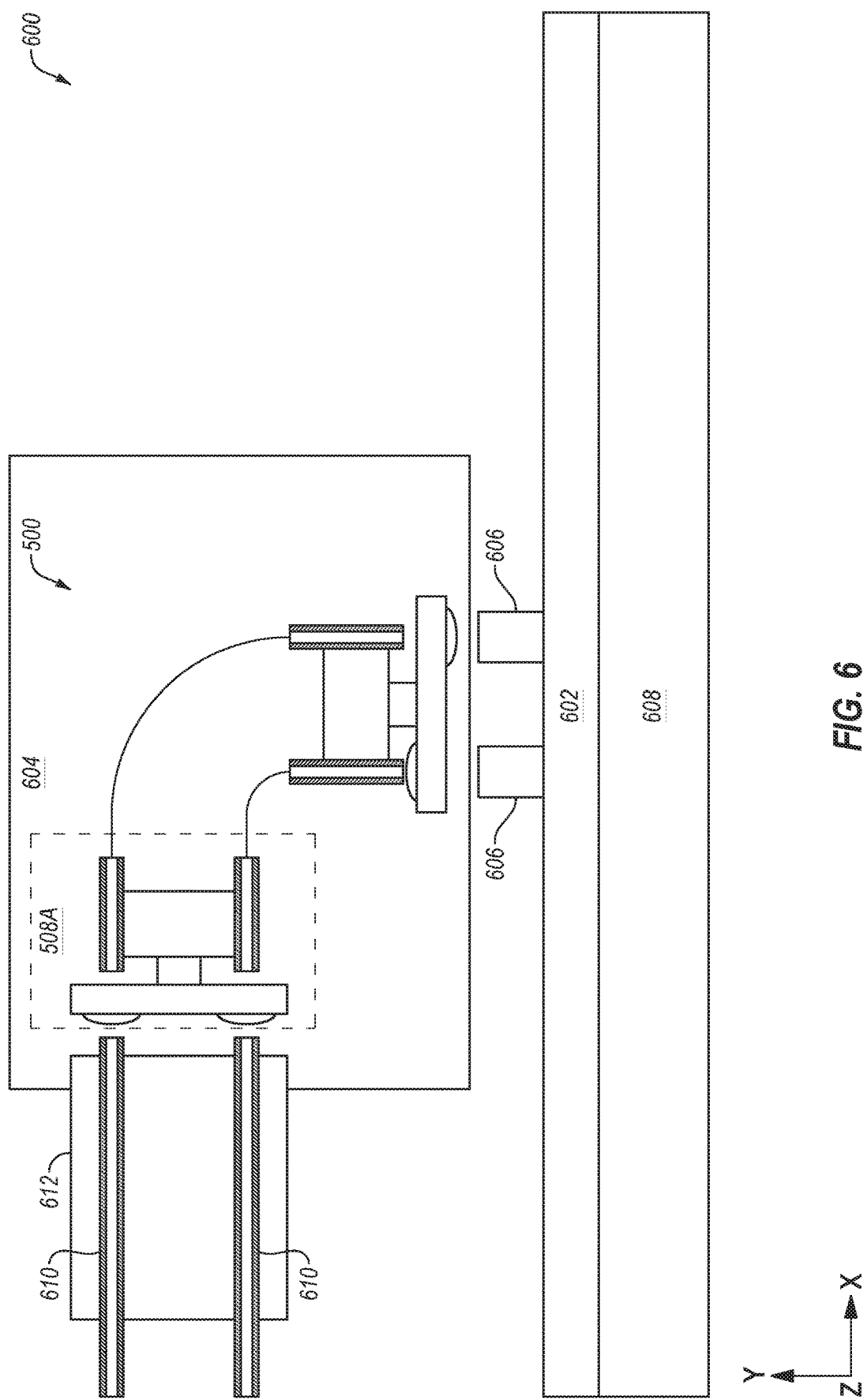
FIG. 6 illustrates an example board-mounted optical engine in which the optical coupling system of FIG. 5 is implemented.

FIG. 6 depicts an example board-mounted optical engine 600 in which the optical coupling system 500 of FIG. 5 is implemented. FIG. 6 is a sectional view of the optical engine 600. The optical engine 600 of FIG. 6 may include board-mounted optical engine, which may be similar (e.g., have similar communication capabilities, optical components, etc.) to the optical engine 51 of FIG. 2A, FINISAR® 25 G BOA, FINISAR® 10G BOA or another optical engine.

In FIG. 6, the optical engine 600 is depicted along with optical fibers 610. The optical fibers 610 may be retained in a plug 612. The plug 612 may be received in a lens retention super-structure 604, which may position ends of the optical fibers 610 relative to the first subassembly 508A. In some embodiments, the optical fibers 610 may be part of a bundle of optical fibers. For instance, the bundle of optical fibers 610 may include two or more rows of optical fibers stacked in the y-direction or a printable polymer optical fiber ribbon. Additionally, in some embodiments, the optical fibers 610 may be included in two or more separate printable polymer optical fiber ribbons.

One or more active optical components 606 are mounted to a flex circuit 602. The flex circuit 602 may be further mounted to or otherwise retained relative to a board 608. In some embodiments, the flex circuit 602 may surround the board 608 in at least one direction. Additionally, in some embodiments, the active optical components 606 may be mounted to an intermediate structure that is mounted to the flex circuit 602. Additionally or alternatively, the active optical components 606 may be included with one or more other optical and/or communication components.

The optical coupling system 500 may replace the lens structure 101 described with reference to FIG. 2B. For example, the optical coupling system 500 may be used to communicate optical signals (e.g., 502 of FIG. 5) between the optical fibers 610 and the active optical components 606. The optical coupling system 500 may enable positioning of the active optical components 606 at various locations on the flex circuit 602. For instance, referring to FIGS. 2A and 2B, the lens structure 101 requires the positioning of the optical components 108 at a particular positions relative to the optical fiber ends 115A and 115B. The particular positions may be dictated based on the characteristics of the angled mirror 105, dimensions of the lenses 103, etc. In contrast, implementation of the optical coupling system 500 may enable separation of the active optical components 606 from the first subassembly 508A and the optical fibers 610. In particular, the active optical components 606 may be separated from one another and/or at various locations on the flex circuit 602. The ability to separate the active optical components 606 may improve the flexibility in design of the optical engine 600. Moreover, separation of the active optical components 606 may reduce or eliminate transfer of thermal energy between the active optical components 606.

Additionally, the first subassembly 508A, the retention super-structure 604, and the particular plug 612 may be sized for a particular application. For example, the lens assembly 55 of FIG. 2A is sized to retain the MT ferrule. Accordingly, the lens assembly 55 may have particular dimensions suited to receive the MT ferrule. In contrast, the retention super-structure 604 and/or the plug 612 may not comply to the MT ferrule standards. Instead, the retention super-structure 604 and the plug 612 may be larger or smaller than the lens assembly 55 of FIG. 2A in at least one dimension. Additionally, the retention super-structure 604 may be shaped to house the optical coupling system 500, which may be configured based on locations of the active optical components 606. This flexibility may increase or reduce overall size of the optical engine 600 and may result in optical engines 600 with improved thermal characteristics.

Terms used in the disclosure and in the appended claims (e.g., bodies of the appended claims) are generally intended as "open" terms (e.g., "including" should be interpreted as "including, but not limited to," "having" should be interpreted as "having at least," "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one," "one or more," "at least one of the following," and "one or more of the following" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the example embodiments and the concepts contributed by the inventor to furthering the art, and are to be construed as being without limitation to such specifically-recited examples and conditions.

What is claimed is:

1. An optical coupling system comprising:
   a first flexible waveguide that includes a first waveguide end, a second waveguide end, and a waveguide core;
   a first lens that is positioned relative to a first optical fiber such that a core of the first optical fiber is aligned with the first lens;

a first lens holder that includes:
  a lens retention portion that retains the first lens, the lens retention portion being transparent such that an optical signal is transmissible through the lens retention portion; and
  a waveguide retention portion on which the first waveguide end of the first flexible waveguide is positioned such that the first waveguide end is adjacent to and separated from the lens retention portion and the waveguide core is aligned with the first lens;
a second lens that is aligned relative to a first optical component; and
a second lens holder that includes:
  a lens retention portion that retains the second lens, the lens retention portion being transparent such that the optical signal is transmissible through the lens retention portion; and
  a waveguide retention portion on which the second waveguide end of the first flexible waveguide is positioned such that the second waveguide end is adjacent to and separated from the lens retention portion of the second lens holder and the waveguide core is aligned with the second lens,
wherein the first flexible waveguide is comprised of a flexible polymer and configured such that the first lens holder is movable relative to the second lens holder to permit the first optical component to move away from the first optical fiber to remove dimensional limitations between the first optical component and the first optical fiber.

2. The optical coupling system of claim 1, further comprising:
a second flexible waveguide that includes a first waveguide end, a second waveguide end, and a waveguide core;
a third lens retained by the lens retention portion of the first lens holder relative to a second optical fiber such that a core of the second optical fiber is aligned with the third lens; and
a fourth lens retained by the lens retention portion of the second lens holder such that the fourth lens is aligned with a second optical component;
wherein:
  the first waveguide end of the second flexible waveguide is positioned on the waveguide retention portion of the first lens holder such that the first waveguide end of the second flexible waveguide is adjacent to the lens retention portion of the first lens holder and the waveguide core of the second flexible waveguide is aligned with the third lens; and
  the second waveguide end of the second flexible waveguide is positioned on the waveguide retention portion of the second lens holder such that the second waveguide end of the second flexible waveguide is adjacent to the lens retention portion of the second lens holder and the waveguide core of the second flexible waveguide is aligned with the fourth lens.

3. The optical coupling system of claim 2, wherein:
the first optical fiber includes a first end;
the second optical fiber includes a first end;
the first optical fiber is aligned with the first lens at the first end;
the second optical fiber is aligned with the third lens at the first end;
the first end of the first optical fiber is separated from the first end of the second optical fiber by a first distance in a first direction;

the first optical component is separated from the second optical component by a second distance in a second direction;
the second distance is different from the first distance; and
the second direction is different from the first direction.

4. The optical coupling system of claim 1, wherein:
the flexible polymer is comprised of a printable polymer;
the first flexible waveguide includes a core diameter of about 60 microns (μm) at the first waveguide end and about 40 μm at the second waveguide end; and
the core of the first optical fiber is about 50 μm.

5. The optical coupling system of claim 1, wherein:
the waveguide retention portion defines a V-groove that is configured to receive the first waveguide end and align the first waveguide end relative to the first lens; and
the first waveguide end is secured in the V-groove by an epoxy.

6. The optical coupling system of claim 1, wherein:
the lens retention portion of the second lens holder comprises a first surface which is adjacent to the waveguide retention portion of the second lens holder, and a second surface that is opposite to the first surface; and
the second lens is positioned on the first surface.

7. The optical coupling system of claim 1, wherein:
the lens retention portion of the second lens holder comprises a first surface which is adjacent to the waveguide retention portion of the second lens holder and a second surface which is opposite to the first surface; and
the second lens is positioned on the second surface.

8. A board-mounted optical engine comprising the optical coupling system of claim 1.

9. An optical module that includes the optical coupling system of claim 1.

10. An optical module configured to communicate an optical signal via a first optical fiber, the optical module comprising:
a flex/stiffener;
a first active optical component that is positioned on the flex/stiffener;
a first flexible waveguide that includes a first waveguide end, a second waveguide end, and a waveguide core;
a first lens that is positioned relative to a first optical fiber such that a core of the first optical fiber is aligned with the first lens;
a first lens holder that includes a lens retention portion that retains the first lens and a waveguide retention portion on which the first waveguide end is positioned such that the first waveguide end is adjacent to and separated from the lens retention portion and the waveguide core is aligned with the first lens, wherein the lens retention portion of the first lens holder is transparent such that optical signals are transmissible through the lens retention portion;
a second lens that is aligned relative to the first active optical component; and
a second lens holder that includes a lens retention portion that retains the second lens and a waveguide retention portion on which the second waveguide end is positioned such that the second waveguide end is adjacent to and separated from the lens retention portion of the second lens holder and the waveguide core is aligned with the second lens, wherein the lens retention portion of the second lens holder is transparent such that optical signals are transmissible through the lens retention portion, wherein the first flexible waveguide is comprised of a flexible polymer and configured such that the first lens holder is movable relative to the second lens holder to permit movement of the flex/stiffener away from the optical fiber to remove dimensional limitations between the first active optical component and the first optical fiber.

11. The optical module of claim 10, further comprising a module housing, wherein at least one dimension of the module housing is substantially compliant with C form factor pluggable multi-source agreement (MSA).

12. The optical module of claim 10, further comprising a printed circuit board, wherein:
the flex/stiffener that is oriented substantially parallel to the printed circuit board;
the lens retention portion of the first lens holder is substantially perpendicular to the flex/stiffener; and
the lens retention portion is configured such that an optical signal is transmissible through the lens retention portion.

13. The optical module of claim 10, further comprising:
a second active optical component that is positioned on the flex/stiffener;
a second flexible waveguide that includes a first waveguide end, a second waveguide end, and a waveguide core;
a third lens retained by the lens retention portion of the first lens holder relative to a second optical fiber such that the waveguide core of the second optical fiber is aligned with the third lens; and
a fourth lens retained by the lens retention portion of the second lens holder such that the fourth lens is aligned with the second active optical component.

14. The optical module of claim 13, wherein:
the first waveguide end of the second flexible waveguide is positioned on the waveguide retention portion of the first lens holder such that the first waveguide end of the second flexible waveguide is adjacent to the lens retention portion of the first lens holder and the waveguide core of the second flexible waveguide is aligned with the third lens;
the second waveguide end of the second flexible waveguide is positioned on the waveguide retention portion of the second lens holder such that the second waveguide end of the second flexible waveguide is adjacent to the lens retention portion of the second lens holder and the waveguide core of the second flexible waveguide is aligned with the fourth lens;
the first optical fiber, at a first end that is aligned with the first lens, and the second optical fiber, at a first end that is aligned with the third lens are separated by a first distance in a first direction; and
the first direction is in a plane that is parallel to the flex/stiffener.

15. The optical module of claim 14, wherein the first active optical component is separated from the second active optical component in the first direction by a second distance that is different from the first distance.

16. A board-mounted optical engine configured to communicate an optical signal via a first optical fiber, the board-mounted optical engine comprising:
a flex circuit;
an active optical component electrically coupled to the flex circuit;
a first flexible waveguide that includes a first waveguide end, a second waveguide end, and a waveguide core;
a first lens that is positioned relative to a first optical fiber such that a core of the first optical fiber is aligned with the first lens;
a first lens holder that includes a lens retention portion that retains the first lens and a waveguide retention portion on which the first waveguide end of the first flexible waveguide is positioned such that the first waveguide end is adjacent to and separated from the lens retention portion and the waveguide core is aligned with the first lens, wherein the lens retention portion of the first lens holder is transparent such that optical signals are transmissible through the lens retention portion;
a second lens that is aligned relative to the first active optical component;
a second lens holder that includes a lens retention portion that retains the second lens and a waveguide retention portion on which the second waveguide end of the first flexible waveguide is positioned such that the second waveguide end is adjacent to and separated from the lens retention portion of the second lens holder and the waveguide core is aligned with the second lens wherein the lens retention portion of the second lens holder is transparent such that optical signals are transmissible through the lens retention portion; and
a lens retention super-structure configured to house the first lens holder and the second lens holder such that the second lens holder is aligned with the first active optical component,
wherein the first flexible waveguide is comprised of a flexible polymer and configured such that the first lens holder is movable relative to the second lens holder to permit the first active optical component to move away from the first optical fiber to remove dimensional limitations between the first active optical component and the first optical fiber.

17. The board-mounted optical engine of claim 16, wherein:
the lens retention super-structure is configured to be connected to an optical fiber bundle such that the optical fiber bundle is retained in proximity to the first lens holder; and
the optical fiber bundle includes the first optical fiber.

18. The board-mounted optical engine of claim 16, further comprising:
a second flexible waveguide that includes a first waveguide end, a second waveguide end, and a waveguide core;
a third lens retained by the lens retention portion of the first lens holder relative to a second optical fiber such that a core of the second optical fiber is aligned with the third lens; and
a fourth lens retained by the lens retention portion of the second lens holder such that the fourth lens is aligned with a second optical component;
wherein:
the first waveguide end of the second flexible waveguide is positioned on the waveguide retention portion of the first lens holder such that the first waveguide end of the second flexible waveguide is adjacent to and separated from the lens retention portion of the first lens holder and the waveguide core of the second flexible waveguide is aligned with the third lens;
the second waveguide end of the second flexible waveguide is positioned on the waveguide retention portion of the second lens holder such that the second waveguide end of the second flexible waveguide is adjacent to and separated from the lens retention portion of the second lens holder and the waveguide core of the second flexible waveguide is aligned with the fourth lens;

the second lens and the fourth lens are positioned on a surface of the second lens holder;

the first optical fiber is positioned a particular distance from the second optical fiber in a first direction; and the first direction is substantially perpendicular to the surface of the second lens holder.

19. The board-mounted optical engine of claim 18, wherein the first optical fiber and the second optical fiber are part of an optical fiber bundle, the optical fiber bundle including a plurality of optical fibers arranged in at least two rows.

20. The board-mounted optical engine of claim 18, wherein:

the first flexible waveguide includes a curved portion between the first waveguide end and the second waveguide end;

the curved portion of the first flexible waveguide includes a bending radius that is greater than about 2 millimeters (mm)

the second flexible waveguide includes a curved portion between the first waveguide end and the second waveguide end; and the curved portion of the second flexible waveguide includes a bending radius that is greater than the bending radius of the curved portion of the first flexible waveguide.

* * * * *